United States Patent
Chefetz

(10) Patent No.: US 8,904,969 B2
(45) Date of Patent: Dec. 9, 2014

(54) LEASH WITH DUAL TRIGGER

(75) Inventor: Nathan S. Chefetz, McLean, VA (US)

(73) Assignee: Coastal Pet Products, Inc., Alliance, OH (US)

( * ) Notice: Subject to any disclaimer, the term of this patent is extended or adjusted under 35 U.S.C. 154(b) by 349 days.

(21) Appl. No.: 12/924,629

(22) Filed: Sep. 30, 2010

(65) Prior Publication Data

US 2012/0079994 A1    Apr. 5, 2012

(51) Int. Cl.
*A01K 27/00* (2006.01)
*B65H 75/44* (2006.01)

(52) U.S. Cl.
CPC .......... *A01K 27/004* (2013.01); *B65H 75/4431* (2013.01); *B65H 75/4444* (2013.01)
USPC .......................................... 119/796

(58) Field of Classification Search
USPC .......................................... 119/796
See application file for complete search history.

(56) References Cited

U.S. PATENT DOCUMENTS

| | | | |
|---|---|---|---|
| 2,217,323 A | 10/1940 | Sackett | |
| 3,853,283 A | 12/1974 | Croce et al. | |
| 4,501,230 A | 2/1985 | Talo | |
| 5,377,626 A * | 1/1995 | Kilsby et al. | 119/796 |
| 6,148,773 A | 11/2000 | Bogdahn | |
| 6,405,683 B1 | 6/2002 | Walter et al. | |
| 6,694,922 B2 | 2/2004 | Walter et al. | |
| 7,040,257 B2 * | 5/2006 | Waxman et al. | 119/796 |
| 2003/0145803 A1 * | 8/2003 | Muller | 119/796 |
| 2004/0237907 A1 * | 12/2004 | Muller | 119/796 |
| 2005/0011472 A1 * | 1/2005 | Wuensche | 119/796 |
| 2008/0230015 A1 | 9/2008 | Bleshoy | |
| 2009/0217886 A1 | 9/2009 | Lopusnak et al. | |
| 2009/0277398 A1 * | 11/2009 | Shi | 119/796 |
| 2011/0073047 A1 * | 3/2011 | Simpson et al. | 119/796 |
| 2011/0120388 A1 * | 5/2011 | Shahbaz | 119/796 |
| 2011/0146592 A1 * | 6/2011 | Friedrichsen | 119/796 |
| 2011/0239956 A1 * | 10/2011 | Bogdahn | 119/796 |

* cited by examiner

*Primary Examiner* — Son T Nguyen
(74) *Attorney, Agent, or Firm* — Renner, Kenner, Greive, Bobak, Taylor & Weber

(57) ABSTRACT

Retractable leashes use a braking mechanism to stop a dog from movement. A mechanism is provided for smoothly or gradually braking the unreeling of the line, and can include a brake with a pad or pads for stopping the dog much like a bicycle. The brake and pads allow the user to squeeze the trigger lightly or more aggressively to slow and stop the dog's movement without the sudden jerk of traditional retractable leashes. The consumer may ultimately clamp down on the trigger to clamp the pads to the reel instantly for an aggressive stop if needed.

16 Claims, 13 Drawing Sheets

LEASH WITH DUAL TRIGGER

CROSS REFERENCE TO RELATED APPLICATIONS

This application claims the priority of U.S. patent application Ser. No. 12/458,418 filed on Jul. 10, 2009, Inventor Nathan S. Chefetz, now pending; and which in turn claims priority of Provisional Application No. 61/193,182 filed on Nov. 3, 2008, inventor Nathan S. Chefetz, entitled "Retractable Leash." The entire disclosure of this aforementioned provisional patent application is hereby incorporated in its entirety by reference thereto.

STATEMENT REGARDING FEDERALLY SPONSORED RESEARCH OR DEVELOPMENT

Not applicable.

FIELD OF THE INVENTION

The present invention relates generally to retractable leashes for dogs or pets. Such leashes can, for example, be used for a dog or other pet. More particularly, this invention is directed to a retractable leash for smoothly stopping the unreeling of a leash when a dog or other pet is pulling away, so that the dog or other pet is not suddenly jerked to a stop.

BACKGROUND OF THE INVENTION

Leashes are known which include a reel and a brake for controlling unwinding of the reel, together with a brake release for allowing unwinding.

Typical prior retractable leashes use a braking mechanism, for example that shown in U.S. Pat. No. 5,483,926, to stop a dog from movement. This type of mechanism can cause a sharp jerk, the magnitude of which depends on the size, speed and strength of the pet or dog.

There is a need for an apparatus or device for use in a retractable leash for smoothly stopping the unreeling of a leash when a dog or other pet is pulling away, so that the dog or other pet is not suddenly jerked to a stop.

It is accordingly a problem in the prior art to provide a device for gradually or smoothly stopping unwinding of a pet leash when a pet is pulling away, so that the pet is not suddenly jerked to a stop.

SUMMARY OF THE INVENTION

From the foregoing, it is seen that it is a problem in the art to provide a device meeting the above requirements.

According to the present invention, a device is provided which meets the aforementioned requirements and needs in the prior art. Specifically, the device according to the present invention provides a retractable leash for smoothly stopping the unreeling of a leash when a dog or other pet is pulling away, so that the dog or other pet is not suddenly jerked to a stop.

Further according to the present invention, a second brake lock mechanism is provided as an alternative stopping mechanism. It locks the leash immediately, and does not provide a gentle stop. It is used for urgent stops, and can also be used as a backup stopping mechanism.

Other objects and advantages of the present invention will be more readily apparent from the following detailed description when read in conjunction with the accompanying drawings.

DETAILED DESCRIPTION OF THE INVENTION

If a dog begins to stray from origin, and the owner wants to stop the dog, they have no choice but to push a lock brake button on a typical retractable leash to instantly stop the cord from releasing automatically. However, this can cause a significant stopping force, called a jerk, that makes it very uncomfortable for the dog and the owner/consumer. In some extreme situations, injury on the dog's neck can occur along with injury to the consumer's hand, arm and/or shoulder areas. Thus, there is a need for a gentle stopping retractable leash that slowly and gently stops a consumer's pet without the uncomfortable jerk and possible injury to a dog or consumer during the process.

The present invention, as described more fully hereunder, uses a design for smoothly or gradually braking the unreeling of the line, and includes gentle brakes for stopping the dog much like a bicycle brake. The gentle brakes allow the user to squeeze the trigger lightly or more aggressively to slow and stop the dog's movement without the sudden jerk of traditional retractable leashes. The consumer may ultimately clamp down on the trigger to clamp the pads to the reel instantly for an aggressive stop if needed. Additionally, a sudden braking mechanism is also provided in the present invention as a second stopping mechanism, also described more fully hereunder.

There are numerous benefits in this invention. There are no sudden jerks; there is the ability to train dogs more effectively; there is a reduction in likelihood of a dog/pet injury in neck region; there is a reduction in likelihood of human injury in hand, arm and shoulder region; and the invention allows the user to proactively control the dog or pet movement.

Figure 1:
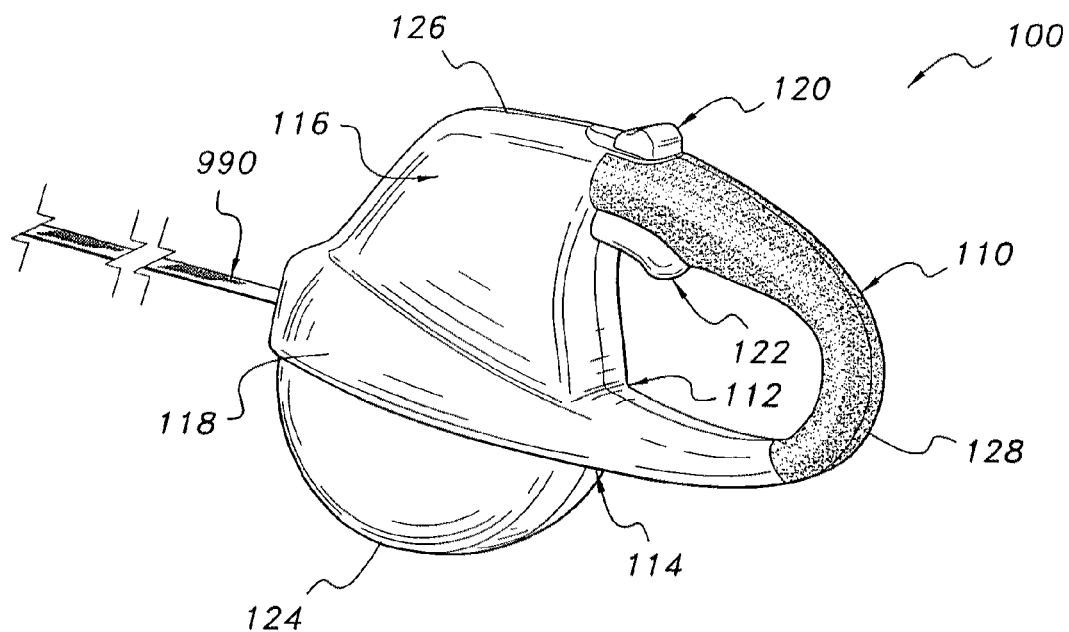
FIG. 1 is perspective view of a retractable leash for gradually slowing unwinding of a cord or line, according to the present invention.

FIG. 1 is perspective view of a retractable leash 100 for gradually slowing unwinding of a cord or line 990. The retractable leash 100 has a casing 116, a brake lock button 120, a gentle stop trigger 122, a handle 110, an upper surface 126, a side surface 118, a lower reel housing surface 124, and a lower handle portion 128. The handle 110 joins the reel casing 116 at junction portions 112 and 114.

The retractable leash 100 shown in FIG. 1 includes a pet leash reel 200 (shown in FIG. 6) and the exterior casing 116 for housing the reel 600 and the extensible and retractable cord or line 990 (shown broken away in FIG. 1). The handle 110 is preferably formed of a soft grip material or other ergonomic material selected for comfort of the user as well as for strength.

In use, the consumer simply squeezes the gentle stop trigger 122 and the dog or pet will feel resistance and slowly or gradually come to a stop. The consumer can apply a little pressure or can apply a lot of pressure to the gentle stop trigger 122, to stop the dog or pet slowly or quickly.

Also in use, to prevent the dog or pet from moving forward again after completely stopping, the consumer can engage the brake lock button 120 for safety. The consumer simply pushes the brake lock button 120 forward and holds it to lock. The consumer can keep the brake lock button 120 pushed forward to hold it in the locked position. To release the brake lock button 120, the consumer can pull back on the brake lock button 120 completely. While ideally the consumer will be using the gentle stop trigger 122 to gently stop the dog or pet, there may be occasions were it is necessary to make quick stops by using the brake lock button 120 without using the gentle stop trigger 122.

An advantage of the present invention is that it is easy to train the dog or pet to recognize when it is time to stop as well. The consumer simply squeezes the gentle stop trigger 122 lightly to signal the dog to slow or stop. The dog may begin to notice this light resistance and thereby learn it's time to slow or come to a stop. Traditional retractable leashes make it difficult to train dogs to stop because they lock instantly without warning.

Figure 2:
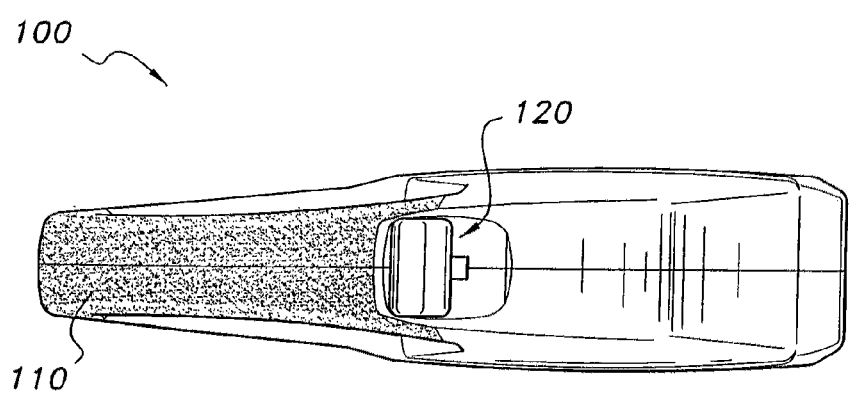
FIG. 2 is a top elevational side view of the retractable leash of FIG. 1, according to the present invention.

FIG. 2 is a top elevational side view of the retractable leash 100 of FIG. 1. This view shows the brake lock button 120, and the top portion of the handle 110.

Figure 3:
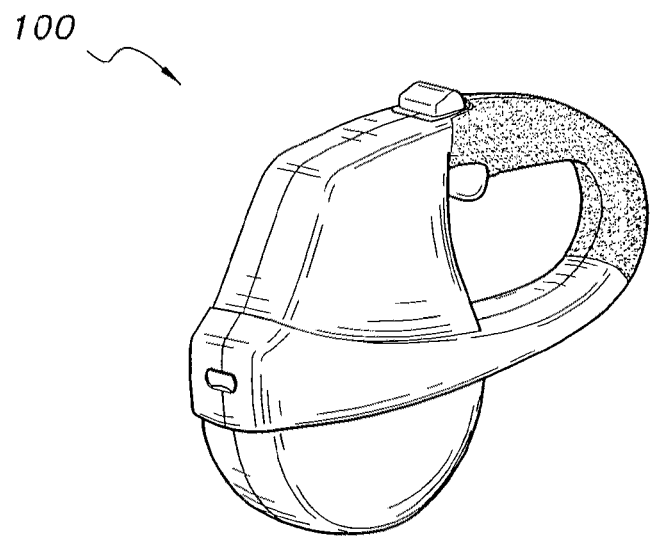
FIG. 3 is a perspective view as seen from the front left direction of the retractable leash of FIG. 1, according to the present invention.

FIG. 3 is a perspective view as seen from the front left direction of the retractable leash 100 of FIG. 1.

Figure 4:
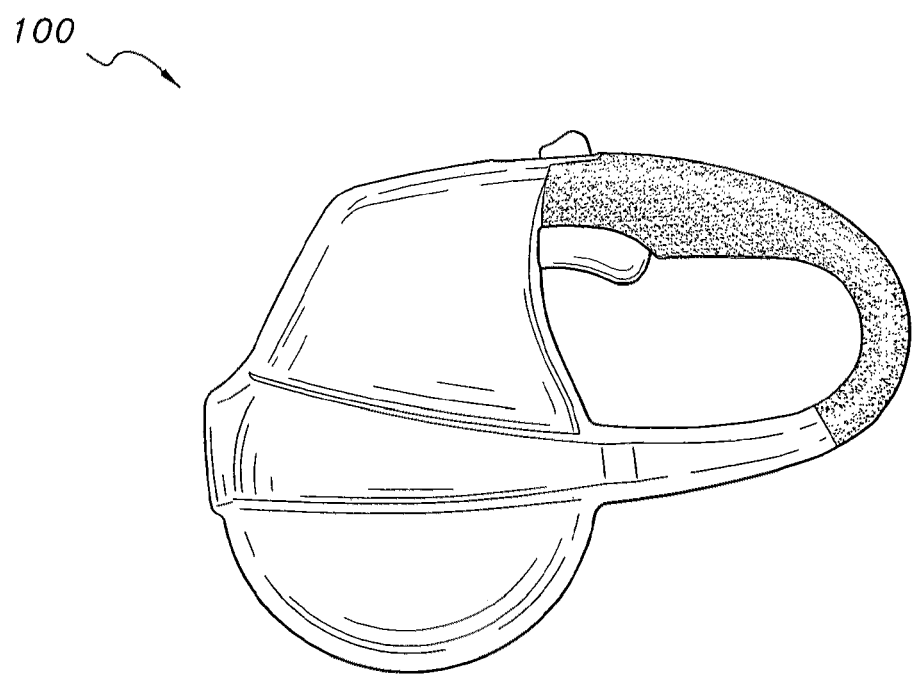
FIG. 4 is a left elevational side view of the retractable leash of FIG. 1, according to the present invention.

FIG. 4 is a left elevational side view of the retractable leash of FIG. 1.

Figure 5:
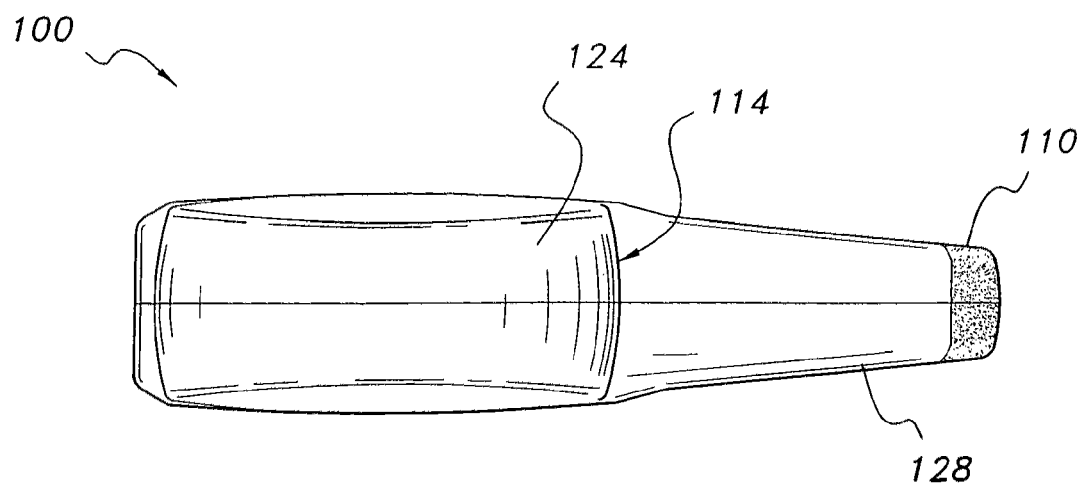
FIG. 5 is a bottom elevational side view of the retractable leash of FIG. 1, according to the present invention.

FIG. 5 is a bottom elevational side view of the retractable leash of FIG. 1. Here, the lower reel housing surface 124, lower portion of the handle 110, the lower handle portion 128, and the junction portion 114 are shown.

Figure 6:
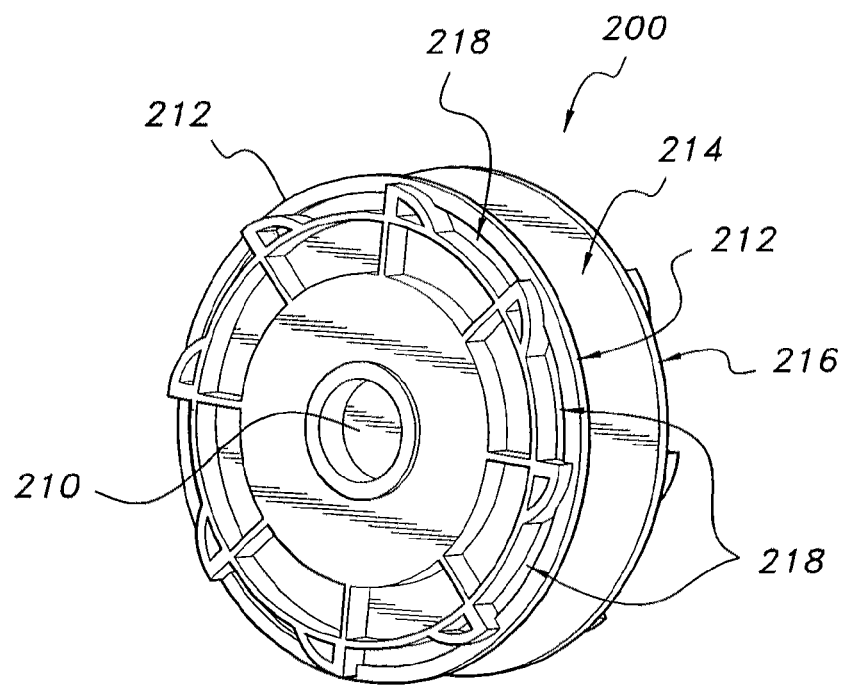
FIG. 6 is a perspective view of a reel used for winding the leash, in the retractable leash of FIG. 1, according to the present invention.

FIG. 6 is a perspective view of the reel 200 used for winding the leash 990 of the retractable leash 100 of FIG. 1. Here, the reel 200 is shown having a central recess 210 for an axle or pin, and a pair of walls 212 and 216 used in typical reel manner for retaining a supply of cord or line 214 therebetween. A plurality of recesses 218 are disposed on the reel 200, to permit stopping engagement with a stopping block 300 (shown in FIG. 9 and discussed below).

The reel 200 has ribbing for strength, but this can be made smooth or solid, of metal or plastic or other appropriate material, and all such variations are within the ambit of skill of anyone skilled in the reel arts.

Figure 7:
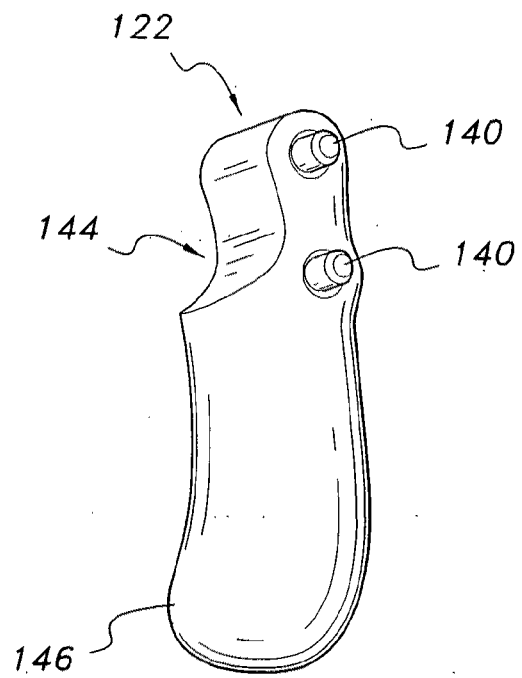
FIG. 7 is a perspective view of the gentle stop trigger used in the retractable leash of FIG. 1, according to the present invention.

FIG. 7 is a perspective view of the gentle stop trigger 122 used in the retractable leash 100 of FIG. 1. The gentle stop trigger 122 has a main body portion 146, a recess portion 144, and two pins 140 and 142. The pin 142 is used to support the gentle stop trigger 122 for pivoting, while the pin 140 connects the gentle stop trigger 122 to a brake member 400 shown in FIG. 10 and described further hereunder.

Figure 8:
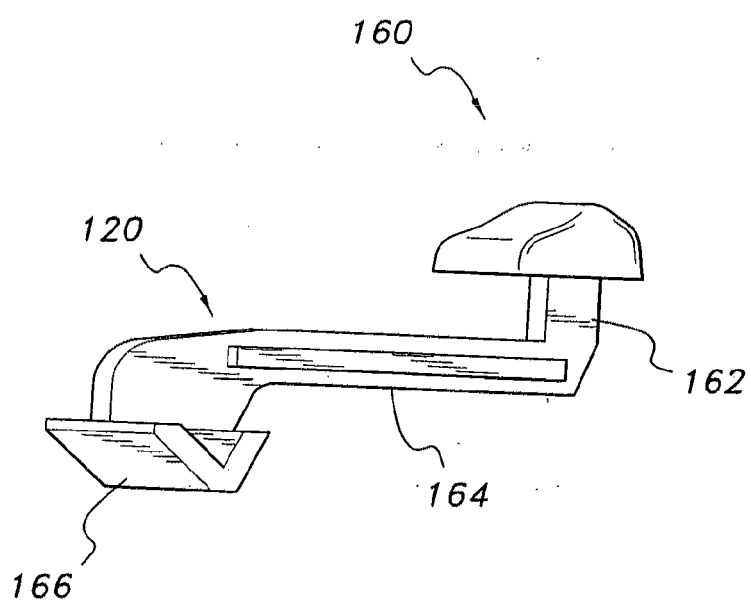
FIG. 8 is a perspective view of the brake lock arm member for causing sudden braking, in the retractable leash of FIG. 1, according to the present invention.

FIG. 8 is a perspective view of a brake lock button 120 for causing sudden braking, in the retractable leash 100 of FIG. 1. As shown in FIG. 8, the brake lock button 120 has a button portion 160, a stem 162, an arm portion 164, and a driving end portion 166.

In operation, pushing the brake lock button 120 of FIG. 8 in a forward direction urges the driving end portion 166 into engagement with the block member 300 so that the block member 300 is urged downward into one of the recesses 218 of the reel 200. Release of the brake lock button 120 allows a spring member (shown in FIGS. 11 and 12) to retract the block member 300 from the recesses 218, thereby releasing the reel.

Figure 9:
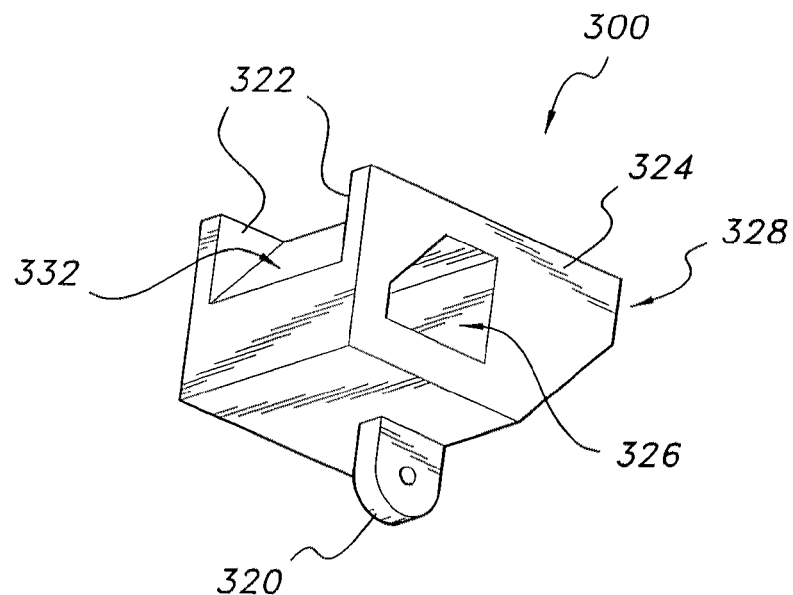
FIG. 9 is a perspective view of a block member cooperating with the brake lock arm member of FIG. 8, for causing sudden braking for the retractable leash of FIG. 1.

FIG. 9 is a perspective view of a block member 300 cooperating with the brake lock button 120 of FIG. 8, for causing sudden braking for the retractable leash 100 of FIG. 1.

The block member 300 has a connecting arm 320, a side wall 324 having a side recess 326, a pair of guide wall portions 322 disposed on either side of an inclined surface 332, and a flat end portion 328. The end portion 166 of the brake lock button 120 of FIG. 8 is received between the pair of guide wall portions 322, for engagement therewith. The block member 300 stops the reel 200 when the block 300 is pushed into one of the recesses 218 in the reel, the recesses being shown in FIG. 6.

Figure 10:
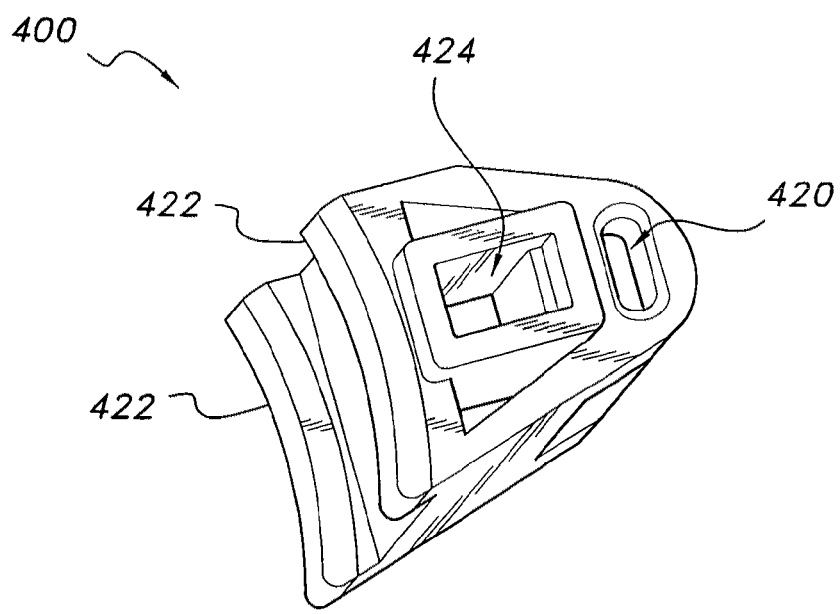
FIG. 10 is a perspective view of a gentle braking member cooperating with the gentle stop trigger of FIG. 7, for causing gentle braking for the retractable leash of FIG. 1.

FIG. 10 is a perspective view of a gentle braking member 400 cooperating with the gentle stop trigger 122 of FIG. 7, for causing gentle braking for the retractable leash 100 of FIG. 1. The gentle braking member 400 has an end portion having a slot 420; a recessed portion 424 which receives a guide pin (not shown, since conventional in the mechanical arts) to constrain sliding motion of the gentle braking member 400 in a linear direction; and braking surfaces 422, 422.

The braking surfaces 422, 422 can be of any material usable for braking, including plastic, ceramic or rubber. All such variations are within the ambit of skill of anyone having skill in the braking arts, and all such variations are contemplated as being within the scope of the present invention.

Figure 11:
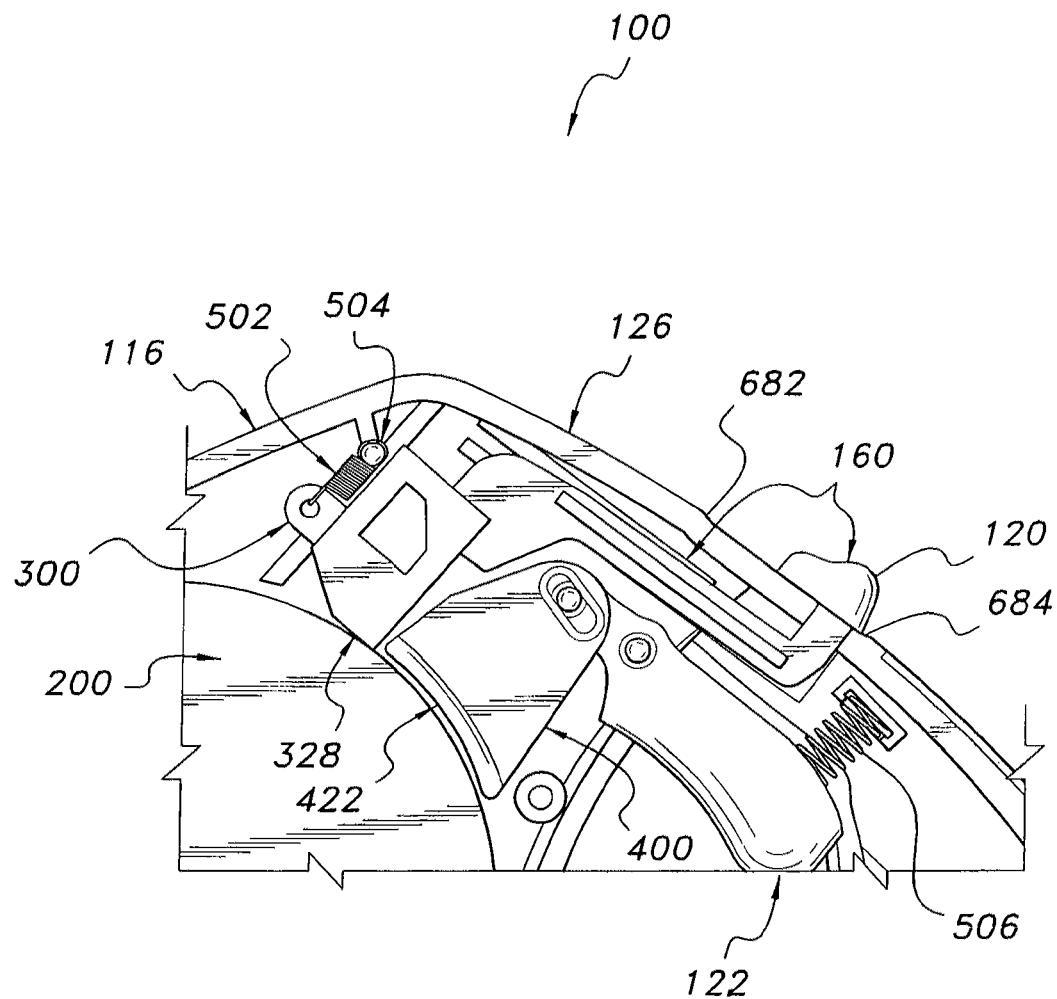
FIG. 11 is an elevational view of the interior mechanism of the retractable leash of FIG. 1, showing a gentle braking member cooperating with the gentle stop trigger of FIG. 7, and also showing a block member cooperating with the brake lock arm member of FIG. 8, for causing sudden braking for the retractable leash.

FIG. 11 is an elevational view of the interior mechanism of the retractable leash 100 of FIG. 1. In this view, the cooperation of the brake lock button 120 with the block member 300 is shown. The block member 300 is biased away from the reel 200 by a spring member 502 secured to a pin 504 of the reel housing 116. The brake lock button 120 slides in an aperture in the housing which is located between the points 682 and 684 in FIG. 11. The cooperation of the gentle stop trigger 122 with the gentle braking member 400 is also shown, wherein a spring member 506 resiliently urges the end portion of the gentle stop trigger 122 away from the housing 116.

Figure 12:
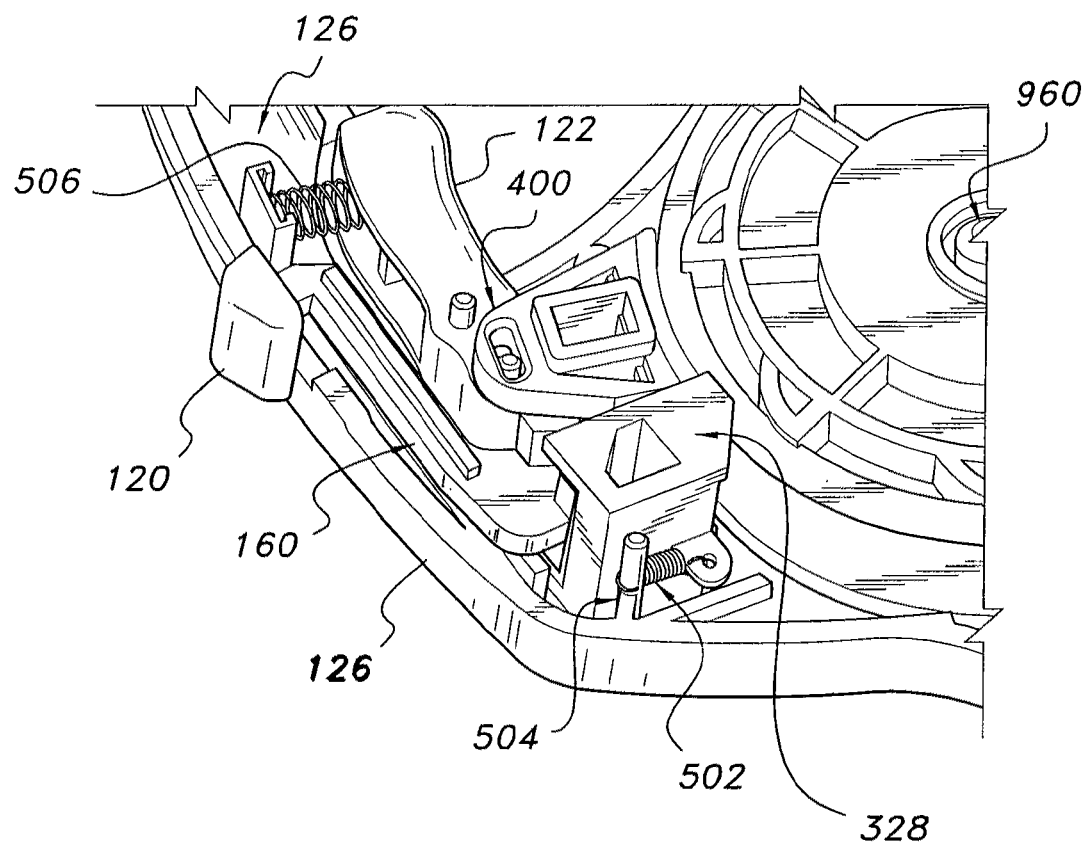
FIG. 12 is a perspective view of the interior mechanism of FIG. 11, showing a gentle braking member cooperating with the gentle stop trigger of FIG. 7, and also showing a block member cooperating with the brake lock arm member of FIG. 8, for causing sudden braking for the retractable leash.

FIG. 12 is a perspective view of the interior mechanism shown in FIG. 11. The parts shown and numbered in FIG. 12 correspond to those shown in FIG. 11.

Figure 13:
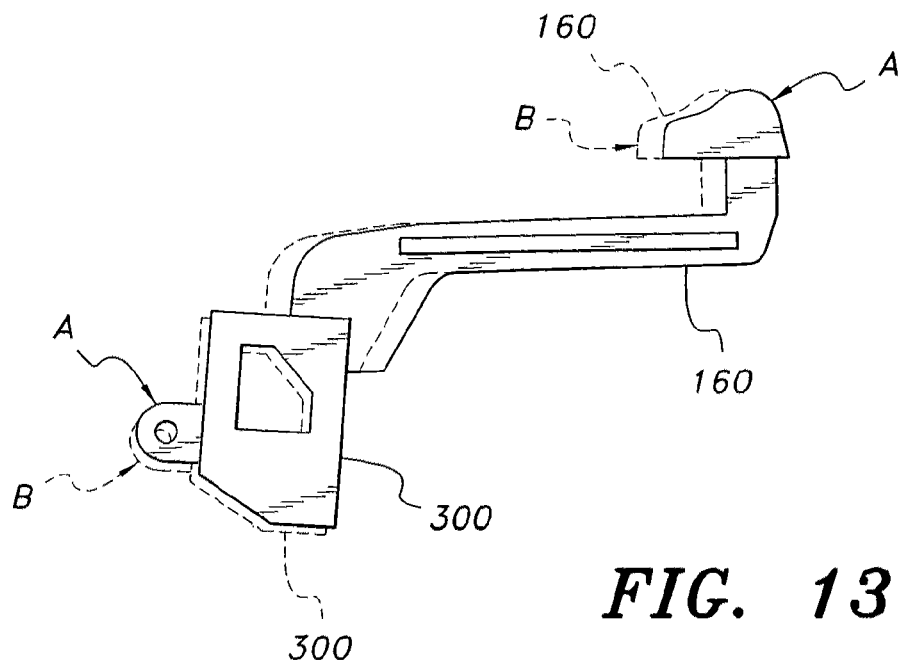
FIG. 13 is a schematic view of the movement of the brake lock mechanism and cooperating block member of FIG. 11, showing an unlocked position "A" and a locked position "B".

FIG. 13 is a schematic view of the movement of the fast brake lock mechanism 160 and cooperating block member 300 of FIG. 11, schematically showing an unlocked position "A" and a locked position "B".

Figure 14:
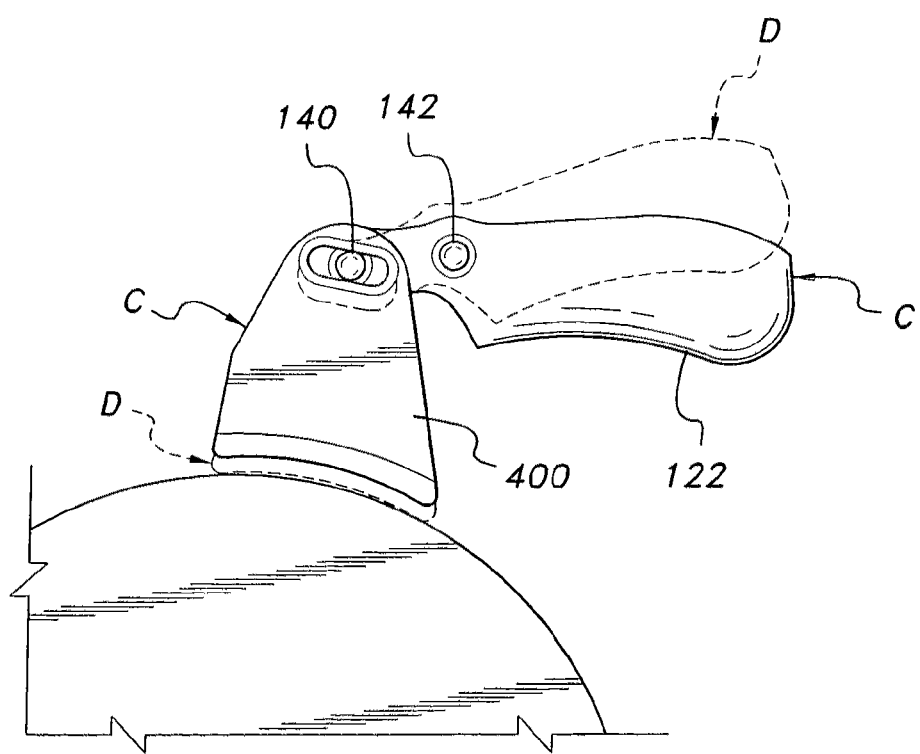
FIG. 14 is a schematic view of the movement of the gentle braking member and cooperating gentle stop trigger of FIG. 11, showing an unbreaked position "C" of the gentle stop trigger and an unbreaked position "E" of the gentle braking member, and a braked position "D" of the gentle stop trigger and a braked position "F" of the gentle braking member.

FIG. 14 is a schematic view of the movement of the gentle braking member 400 and cooperating gentle stop trigger 122 of FIG. 11, showing an unbreaked position "C" of the gentle stop trigger 122 and an unbreaked position "E" of the gentle braking member 400; and also showing a braked position "D" of the gentle stop trigger 122 and a braked position "F" of the gentle braking member 400.

Figure 15:
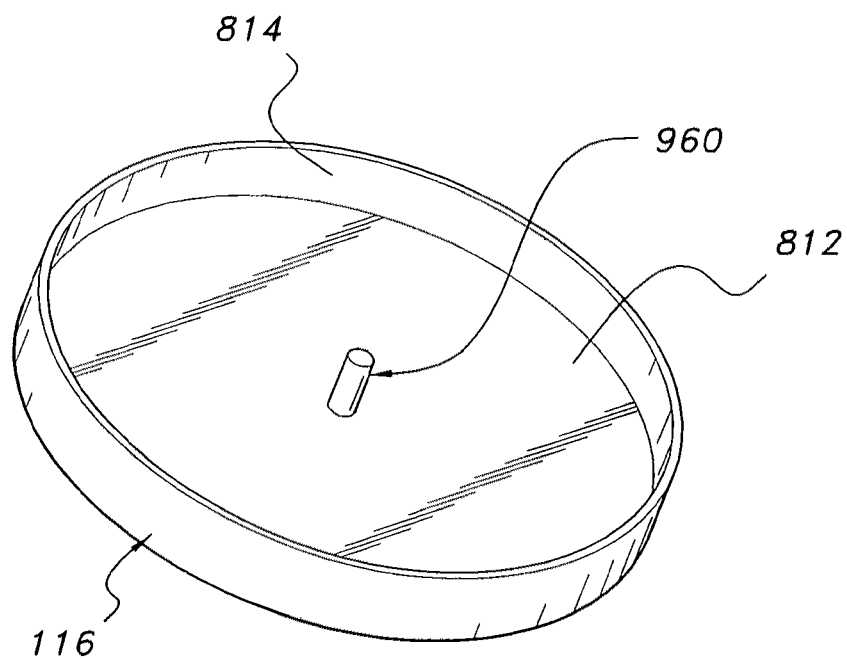
FIG. 15 is a perspective view of the interior of the casing of the retractable leash of FIG. 1, showing a central pin for supporting the reel of FIG. 6.

FIG. 15 is a perspective view of the interior of the casing 116 of the retractable leash 100 of FIG. 1, showing a central pin 960 for supporting the reel 200 of FIG. 6. The casing 116 has an upstanding side wall portion 814 and also has a side wall 812.

Figure 16:
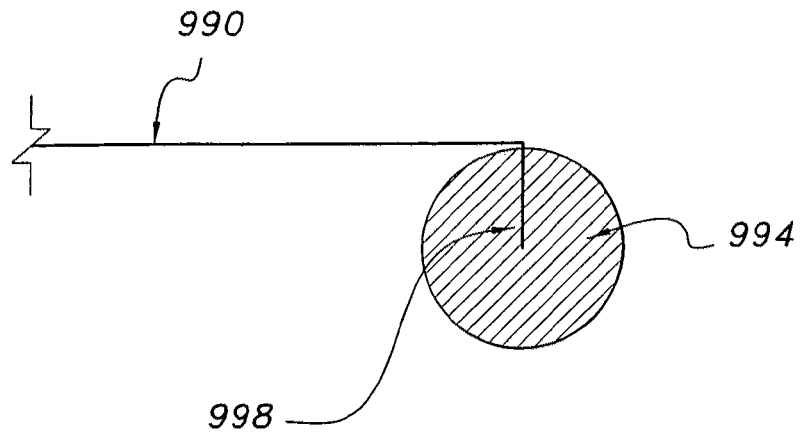
FIG. 16 is a schematic side view of a connection between the axle of the reel of FIG. 6 and the cord or line usable in the leash of FIG. 1.

FIG. 16 is a schematic side view of a connection between an axle 994 of the reel of FIG. 6 and the cord or line 990 usable in the leash of FIG. 1. In this embodiment, the axle 994 is an alternative embodiment of the axle of FIG. 6, and has a slit 998 for receiving and holding the end of the line 990.

Figure 17:
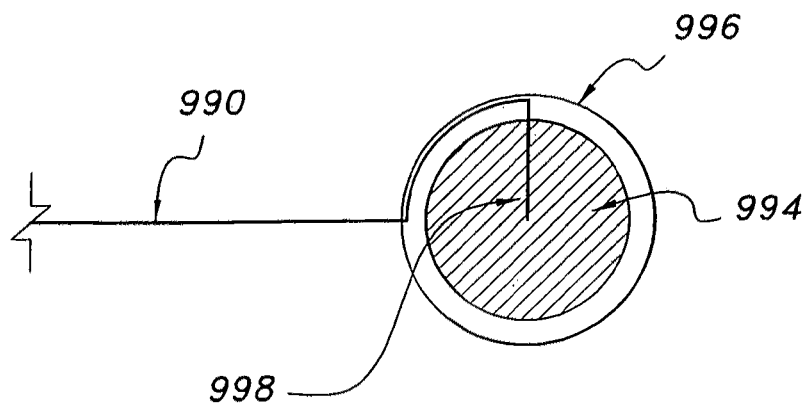
FIG. 17 is a schematic side view of an alternative connection between the axle of the reel of FIG. 6 and the cord or line usable in the leash of FIG. 1, having an additional loop of stretchable cord.

FIG. 17 is a schematic side view of an alternative connection between the axle 960 of the reel 200 of FIG. 6 and the cord or line 990 usable in the leash of FIG. 1. Here, the axle 994 has a slit as in FIG. 16, but has an additional loop 996 of stretchable cord. In this way, when the line or cord 990 runs out suddenly, as when the owner fails to stop the reel, the line does not jerk the pet to a stop suddenly, due to stretching of the stretchable loop 996.

Figure 18:
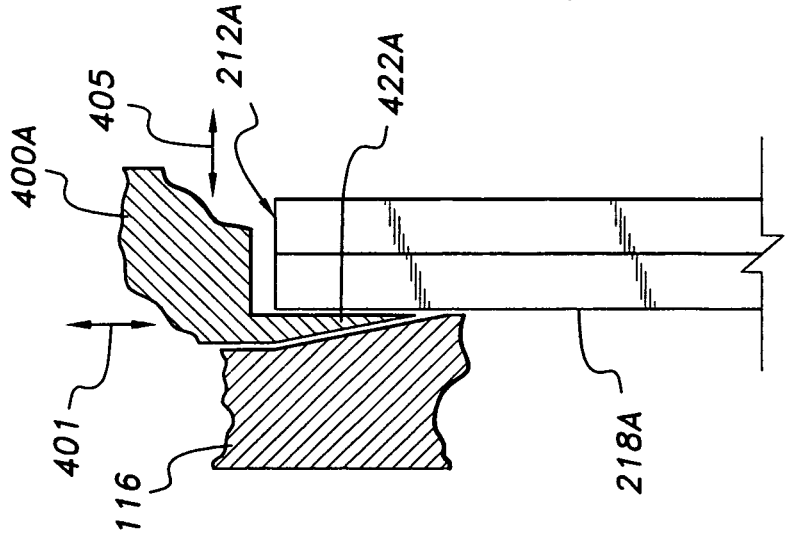
FIG. 18 is a schematic side view, partially in section, of an alternative braking mechanism for slowing the leash reel from the side.

FIG. 18 is a schematic side view, partially in section, of an alternative braking mechanism for slowing the leash reel 200 from the side. In this view, a braking member portion 400A is manually actuable in the direction indicated by arrow 401, such that it comes into contact with the casing wall 116. The braking member portion 400A has a tapering portion 422A which contacts a correspondingly tapered side wall portion of the casing wall 116. This engagement causes the tapering portion 422A of the braking member portion 400A to be urged in the direction indicated by the arrow 405 into pressing engagement with a leash reel wall 212A which has having a solid side wall 218A. The right side wall of the tapering portion 422A then frictionally engages the solid side wall 218A of the leash reel. In this embodiment, a spring member (not shown) can be used to urge the braking member portion 400A toward the left so that it is normally urged away from braking engagement. Alternatively, instead of a spring member, it is possible to use a resiliently deformable material for the braking member portion 400A such that it can be resiliently deformed during braking action such that the pressure exerted by the casing wall 116 can urge the tapering portion 422A toward the left in this view.

The embodiment of FIG. 18 can be alternatively applied so that the braking member is disposed on the inside of the pair of reel walls 212 and 216. In this case, an additional wall portion would be provided serving the same purpose as the casing wall 116.

The materials used for the braking member portion 400A can include rubber or plastic, and can also include such materials as wood or metal.

Figure 19:
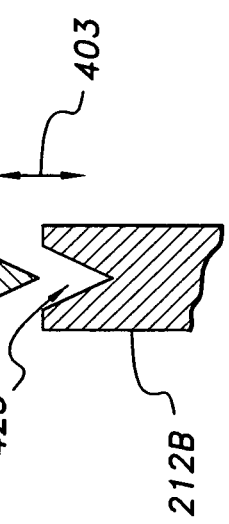
FIG. 19 is a schematic sectional side view of another alternative braking mechanism for slowing the leash reel.

FIG. 19 is a schematic sectional side view of another alternative braking mechanism for slowing the leash reel 200 by contact with a leash reel wall 212B. In this variation, the braking mechanism is identical to that of FIG. 10, except that the braking surface 422B is V-shaped instead of flat, and the end of the leash wall 212B has a V-shaped groove formed therein. The side wall portions of the V-shaped groove in the leash wall 212B do not meet at a sharp edge, but rather at a slight groove portion 423 so as to reduce stresses during braking operation. In this embodiment, as in the embodiment of FIG. 1, the braking member 400B moves in the direction indicated by the double-headed 403.

Figure 20:
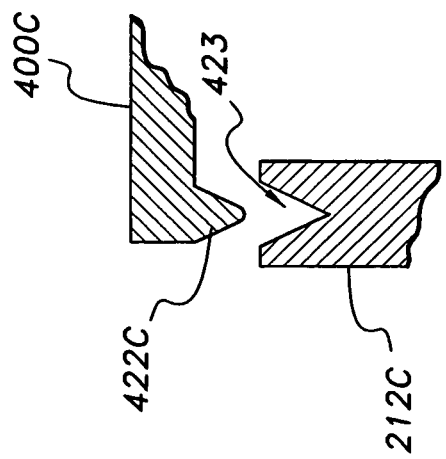
FIG. 20 is a schematic side view in section of a further alternative braking mechanism for slowing the leash reel.

FIG. 20 is a schematic side view in section of a further alternative braking mechanism for slowing the leash reel 200 by contact with a leash reel wall 212C. In this variation, the braking mechanism is identical to that of FIG. 10, except that the braking surface 422C is V-shaped instead of flat, and the end of the leash wall 212C has a V-shaped groove formed therein. The side wall portions of the V-shaped groove in the leash wall 212C here meet at a sharp edge, but the tip of the braking surface 422C is rounded rather than sharp so as to reduce stresses during braking operation. In this embodiment, similarly to the embodiment of FIG. 19, the braking member 400C moves in the direction indicated by the double-headed 403.

Figure 21:
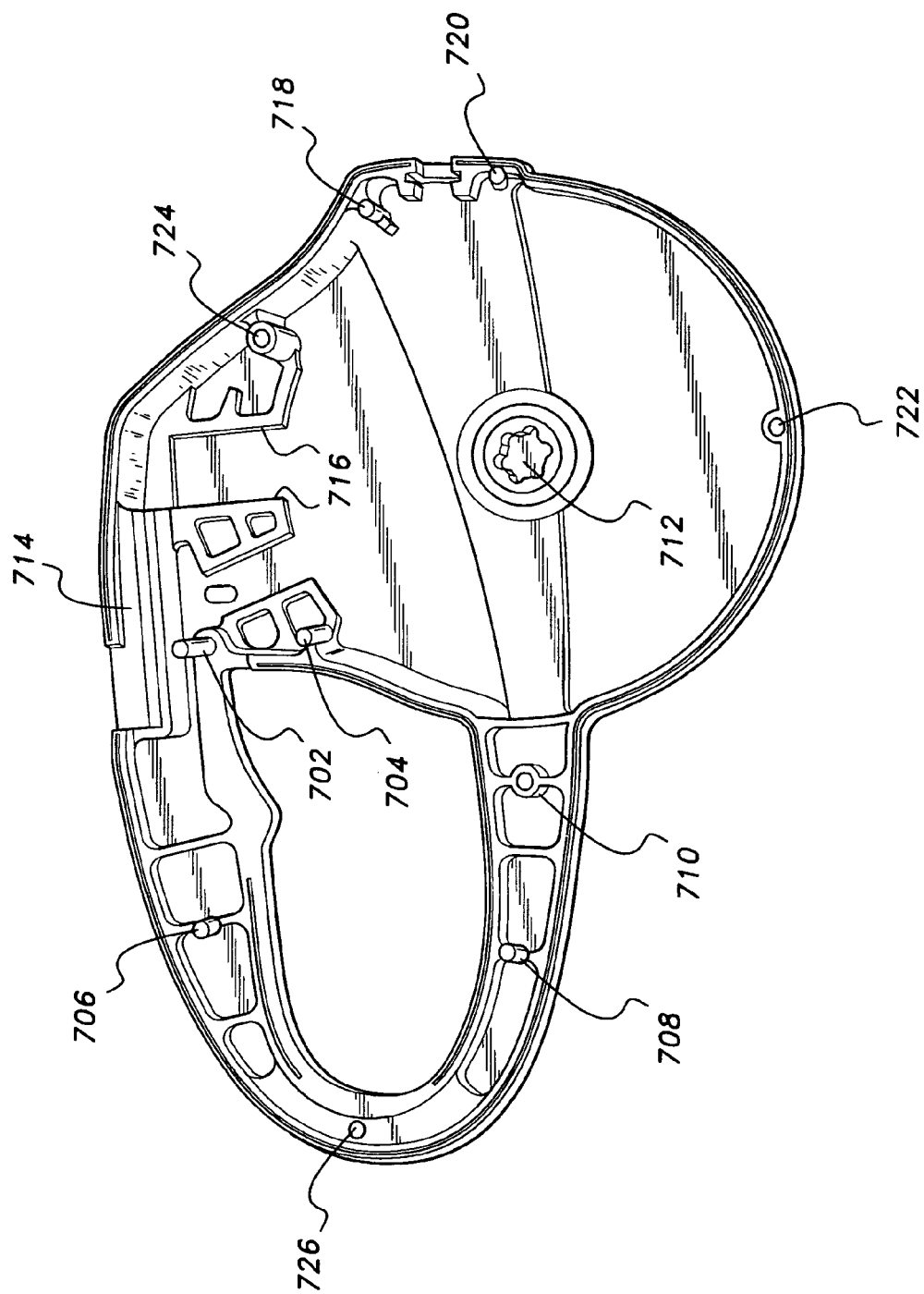
FIG. 21 is a perspective view of an embodiment of a casing portion usable in the embodiment of FIG. 1.

FIG. 21 is a perspective view of an embodiment of a casing portion 700 usable in the embodiment of FIG. 1. The casing portion shown herein corresponds to the visible portion of the casing 166 seen in FIG. 1. In this view, the casing portion 700 mates with a corresponding opposed casing portion (not shown) housing the functioning mechanism and features shown in FIGS. 1-13. The casing portion 700 has upstanding pins 702, 704, 706, 708, 718, and 720. The casing portion 700 has holes such as holes 710 and 722 for receiving pins (not shown) of the opposed casing portion. Other holes can be provided, and other pins can be provided, and such variations are within the scope of the present invention. The recess 712 retains an axle member. A slot 714 is shown for retaining the brake lock button 120. Together with this view and that of FIGS. 1-13, it would be understood by anyone having skill in the casing arts to make an opposed casing portion similar to the casing portion 700 for mating therewith.

Figure 22:
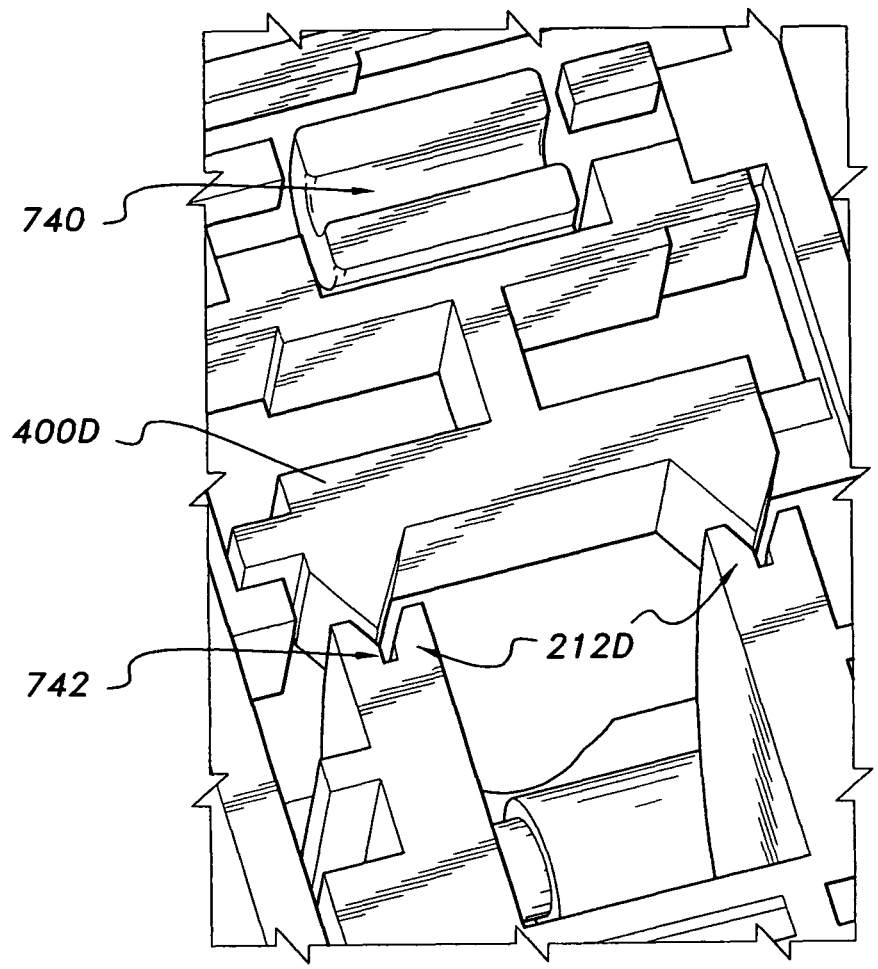
FIG. 22 is a schematic view of a braking mechanism like that of FIG. 19 in operation with a reel.

FIG. 22 is a schematic view of a braking mechanism like that of FIG. 19 in operation with a reel. Here, the notch is designated by numeral 742. This alternative braking mechanism for slowing the leash reel 200 by contact with distal end of the leash reel wall 212D. In this variation, the braking mechanism is identical to that of FIG. 10, except that the braking surface is V-shaped instead of flat, and the end of the leash wall 212D has a V-shaped groove formed therein. The side wall portions of the V-shaped groove in the leash wall 212D do not meet at a sharp edge, but rather at a slight groove portion 742 so as to reduce stresses during braking operation. In this embodiment, as in the embodiment of FIG. 1, the braking member 400D moves in the direction toward and away from contact with the leash wall 212D. In this figure, other elements are schematically indicated including a pin portion 740.

The invention being thus described, it will be evident that the same may be varied in many ways by a routineer in the applicable arts. Such variations are not to be regarded as a departure from the spirit and scope of the invention and all such modifications are intended to be included within the scope of the claims.

What is claimed is:

1. A leash comprising a casing, a rotatable reel carried by said casing and adapted to wind and unwind a retractable cord, said reel having a first portion having a plurality of recesses and a second completely smooth portion which is separate from and laterally adjacent to said first portion and which extend circumferentially around the entirety of the rotatable reel, a first braking mechanism adapted to apply an adjustable frictional braking force to said second completely smooth portion of said reel, and a second braking mechanism adapted to suddenly and completely stop rotation of said reel by engaging one of said recesses of said first portion of said reel, where said second braking mechanism further includes a stopping member and a brake lock button, movement of said brake lock button causing said stopping member to move into one of said recesses to prevent further rotation of said reel, said first braking mechanism including a trigger having a first end, a second end, and two outwardly extending pins spaced from one another, said first end of said trigger extending through a hole in said casing, a first pin being received in holes in said casing to pivotally secure said trigger within said casing, and said second pin being located adjacent said second end of said trigger and received in a slot in a gentle braking member, where pivoting of said trigger causes said second pin to slide within said slot in said gentle braking member, thereby causing said gentle braking member to engage said second completely smooth portion of said reel, and apply a frictional braking force to a portion of said second completely smooth portion of said reel, the amount of the frictional braking force being adjustable dependent on the amount of force being applied on said trigger, said first braking mechanism lacking the ability to engage said plurality of recesses of said first portion of said reel.

2. The leash of claim 1, said casing including a handle, a portion of said trigger extending through an opening in said handle to allow a user to squeeze said trigger with a hand holding said handle.

3. The leash of claim 1, said trigger being biased in an unengaged position.

4. The leash of claim 1, said gentle braking member having an arcuate braking surface adapted to engage said reel.

5. The leash of claim 1, said gentle braking member including a projection that is received in a peripheral groove in said reel.

6. The leash of claim 1, where said gentle braking member includes a tapered surface adapted to engage a tapered surface of said casing when said trigger is pressed.

7. The leash of claim 1, said casing including a handle, said brake lock button being located on said handle.

8. The leash of claim 1, said reel including spaced side walls, said recesses being formed on the outer surface of each of said side walls.

9. The leash of claim 1, said stopping member being biased in an unlocked position.

10. A retractable leash comprising a casing having a handle, a rotatable reel carried within said casing and adapted to wind and unwind a retractable cord, said reel having a first portion having a plurality of recesses and a second completely smooth portion which is separate from and laterally adjacent to said first portion and which extend circumferentially around the entirety of the rotatable reel, a first braking mechanism adapted to apply a gentle frictional braking force to a portion of said second completely smooth portion of said reel, and a second braking mechanism adapted to suddenly and completely stop rotation of said reel by engaging one of said recesses of said first portion of said reel, said first braking mechanism including a trigger pivotally secured within said casing with a portion of said trigger extending through an opening in said handle, said trigger having a first end, a second end, and two outwardly extending pins spaced from one another, said first end of said trigger extending through a hole in said casing, a first pin being received in holes in said casing to pivotally secure said trigger within said casing, and said second pin being located adjacent said second end of said trigger and received in a slot in a gentle braking member, where pivoting of said trigger causes said second pin to slide within said slot in said gentle braking member, thereby causing said gentle braking member to engage said second completely smooth portion of said reel, the amount of the frictional braking force being dependent on the amount of force being applied on said trigger, said first braking mechanism lacking the ability to engage said plurality of recesses of said first portion of said reel, said second braking mechanism including a brake lock button extending through an opening in said handle, where said trigger and said brake lock button are positioned to allow a user to selectively actuate either said first or second brake mechanism with one hand that is holding said handle, where said second braking mechanism further includes a stopping member, movement of said brake lock button causing said stopping member to move into one of said recesses to prevent further rotation of said reel.

11. The leash of claim 10, said first braking mechanism further including a pin extending from said trigger within said casing and a gentle braking member having a slot therein to receive said pin, movement of said trigger causing movement of said pin and said gentle braking member, thereby applying a braking force to said reel.

12. The leash of claim 11, said gentle braking member having an arcuate surface adapted to engage said reel.

13. The leash of claim 11, said gentle braking member having a tapered surface adapted to engage a tapered surface on said casing when said trigger is pressed.

14. The leash of claim 11, said gentle braking member including a projection that is received in a peripheral groove in said reel.

15. The leash of claim 10, said trigger being biased in an unengaged position.

16. The leash of claim 10, said reel including spaced side walls, said recesses being formed on the outer surface of each of said side walls.

* * * * *